(12) United States Patent
Fujisawa

(10) Patent No.: US 11,012,640 B2
(45) Date of Patent: May 18, 2021

(54) ELECTRONIC DEVICE, CONTROL DEVICE FOR ELECTRONIC DEVICE, AND CONTROL METHOD

(71) Applicant: SHARP KABUSHIKI KAISHA, Sakai (JP)

(72) Inventor: Hidenori Fujisawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/543,046

(22) Filed: Aug. 16, 2019

(65) Prior Publication Data

US 2020/0068143 A1    Feb. 27, 2020

(30) Foreign Application Priority Data

Aug. 22, 2018   (JP) .............................. JP2018-155720

(51) Int. Cl.
*H04N 5/272*    (2006.01)
*H04N 5/232*    (2006.01)
*H04N 5/225*    (2006.01)
*H04M 1/02*    (2006.01)

(52) U.S. Cl.
CPC ........... *H04N 5/272* (2013.01); *H04N 5/2253* (2013.01); *H04N 5/23229* (2013.01); *H04M 1/0202* (2013.01)

(58) Field of Classification Search
CPC ..................................................... H04N 5/272
USPC ........................................................ 348/218.1
See application file for complete search history.

(56) References Cited

U.S. PATENT DOCUMENTS

| 2005/0128323 | A1* | 6/2005 | Choi | ...................... G03B 29/00 348/239 |
| 2006/0284971 | A1* | 12/2006 | Wren | .................... H04N 5/2258 348/36 |
| 2017/0085764 | A1* | 3/2017 | Kim | .................... H04N 5/23296 |

FOREIGN PATENT DOCUMENTS

JP      2014-039186 A      2/2014

\* cited by examiner

*Primary Examiner* — Joel W Fosselman
(74) *Attorney, Agent, or Firm* — ScienBiziP, P.C.

(57) ABSTRACT

In order to, in a case where a composite image is to be generated that composites a background image and a person image, position the person image over the background easily, and allows the person and the background to receive light in an identical manner so that natural composition can be carried out, a control device for an electronic device includes: a person region extracting section configured to extract a person image from a narrow-angle image captured by a narrow-angle camera; a background region extracting section configured to extract a background image from a wide-angle image captured by a wide-angle camera; and an image composite section configured to make a composition of the background image and the person image, the narrow-angle camera and the wide-angle camera being aimed in respective directions on an identical side relative to a housing of the electronic device.

7 Claims, 8 Drawing Sheets

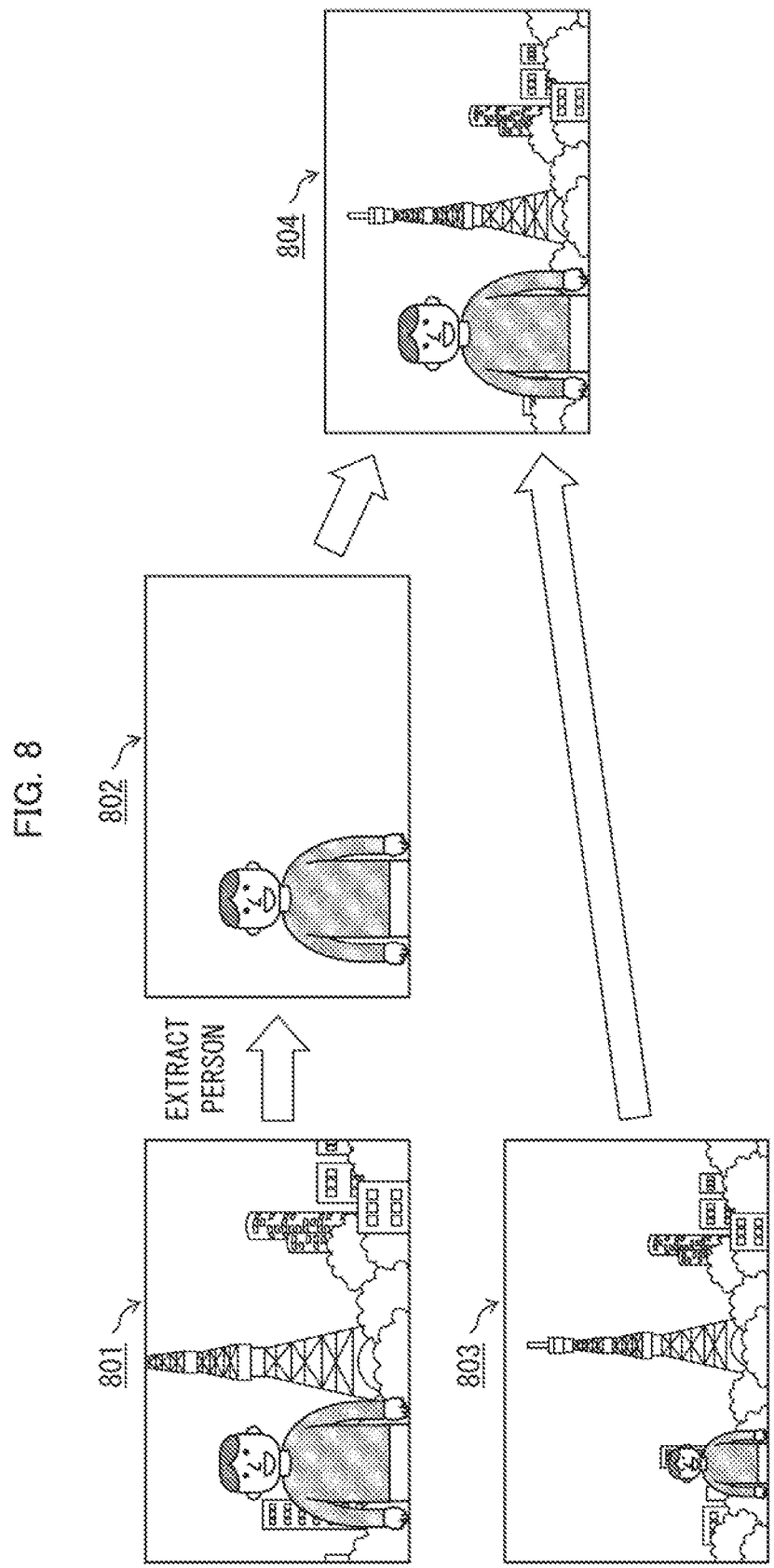

ELECTRONIC DEVICE, CONTROL DEVICE FOR ELECTRONIC DEVICE, AND CONTROL METHOD

This Nonprovisional application claims priority under U.S.C. § 119 on Patent Application. No. 2018-155720 filed in Japan on. Aug. 22, 2018, the entire contents of which are hereby incorporated by reference.

TECHNICAL FIELD

The present invention relates to an electronic device, a control device for an electronic device, and a control method.

BACKGROUND ART

Patent Literature 1 discloses an image forming device that allows a person to photograph the person and scenery simultaneously and superimpose the two images on each other so as to place the image of the person over the image of the desired background. The image forming device includes a first image sensing element and a first camera lens on a principal surface (front surface) of a smartphone on one side together with a display. The image forming device also includes a second image sensing element and a second camera lens on a principal surface (back surface) of the smartphone on the other side.

The image forming device includes a control device including a person region extracting section, a person region tracking section, a superimposed image generating section, and a display control section. The person region extracting section is configured to extract an image of a person region from a front-surface image captured by an image sensing element. The person region tracking section is configured to track the current position of the person region in the front-surface image. The superimposed image generating section is configured to superimpose an image of the person region on a scenery image, captured by an image sensing element, so as to generate a superimposed image. The display control section is configured to cause the display to output the above images in such a manner that the images are switched with each other.

CITATION LIST

Patent Literature

[Patent Literature 1]
Japanese Patent Application Publication, Tokukai, No. 2014-39186 (Publication date: Feb. 27, 2014)

SUMMARY OF INVENTION

Technical Problem

The conventional technique above unfortunately involves the following issues: The technique is configured to capture an image of a person present in a direction opposite to a direction in which a background is present. This makes it difficult to position the image of a person on the background image. Further, since the person and the background receive light differently, the composite image looks unnatural.

An aspect of the present invention has been accomplished in view of the above issues. It is an object of the present invention to provide, for example, an electronic device that makes it easy to, in a case where a composite image is to be generated that composites a background image and a person image, position the person image over the background and that allows the person and the background to receive light in an identical manner so that natural composition can be carried out.

Solution to Problem

In order to attain the above object, an electronic device in accordance with an aspect of the present invention is an electronic device including: a narrow-angle camera; a wide-angle camera; and a control device, the control device being configured to: (i) extract a person image from a narrow-angle image captured by the narrow-angle camera, and (ii) make a composition of (a) a background image captured by the wide-angle camera and (b) the person image, the narrow-angle camera and the wide-angle camera being aimed in respective directions on an identical side relative to a housing of the electronic device.

In order to attain the above object, an electronic device in accordance with an aspect of the present invention is an electronic device including: a narrow-angle camera; a wide-angle camera; and a control device, the control device being configured to: extract a person image from a narrow-angle image captured by the narrow-angle camera, extract a background image from a wide-angle image captured by the wide-angle camera, and (iii) make a composition of the background image and the person image, the narrow-angle camera and the wide-angle camera being aimed in respective directions on an identical side relative to a housing of the electronic device.

In order to attain the above object, a control device in accordance with an aspect of the present invention for an electronic device is a control device for an electronic device including a narrow-angle camera and a wide-angle camera, the control device including: a person region extracting section configured to extract a person image from a narrow-angle image captured by the narrow-angle camera; a background region extracting section configured to extract a background image from a wide-angle image captured by the wide-angle camera; and an image composite section configured to make a composition of the background image and the person image, the narrow-angle camera and the wide-angle camera being aimed in respective directions on an identical side relative to a housing of the electronic device.

In order to attain the above object, a control method in accordance with an aspect of the present invention for an electronic device is a control method for an electronic device including a narrow-angle camera and a wide-angle camera, the control method including the steps of: (a) extracting a person image from a narrow-angle image captured by the narrow-angle camera; (b) extracting a background image from a wide-angle image captured by the wide-angle camera; and (c) making a composition of the background image and the person image, the narrow-angle camera and the wide-angle camera being aimed in respective directions on an identical side relative to a housing of the electronic device.

Advantageous Effects of Invention

An aspect of the present invention advantageously makes it easy to, in a case where a composite image is to be generated that composites a background image and a person image, position the person image over the background, and allows the person and the background to receive light in an identical manner so that natural composition can be carried out.

BRIEF DESCRIPTION OF DRAWINGS

FIG. 8 provides diagrams illustrating how a composite image is generated by extracting a person image from a narrow-angle image and compositing the person image and a background image as a wide-angle image.

DESCRIPTION OF EMBODIMENTS

Embodiment 1

Figure 1:
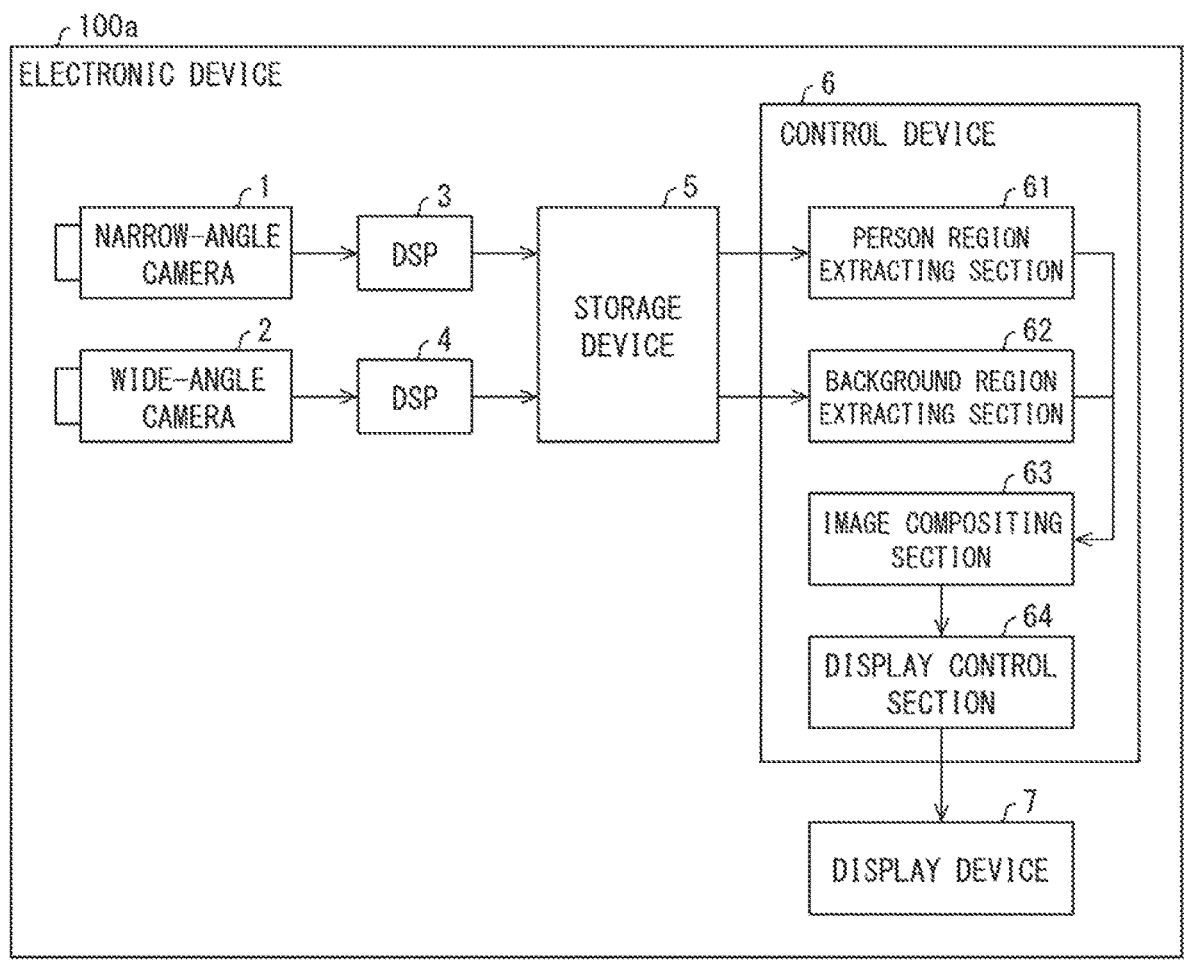
FIG. 1 is a block diagram schematically illustrating a configuration of an electronic device in accordance with Embodiment 1 of the present invention.

The following description will discuss an embodiment of the present invention in detail. As illustrated in FIG. 1, an electronic device 100a in accordance with Embodiment 1 includes a narrow-angle camera 1, a wide-angle camera 2, a DSP 3, a DSP 4, a storage device 5, a control device 6, and a display device 7.

The electronic device 100a in accordance with the present embodiment includes a narrow-angle camera 1 and a wide-angle camera 2 on an identical surface of a housing. The electronic device 100a is configured to carry out a process of) extracting a person image from a narrow-angle image captured by the narrow-angle camera 1, extracting a background image from a wide-angle image captured by the wide-angle camera 2, and (iii) compositing the person image and the background image with each other so as to generate a composite image.

The narrow-angle camera 1 includes a narrow-angle lens. A narrow-angle lens provides an angle of view for a camera which angle is narrower than normal. A narrow-angle camera also provides an angle of view for a camera which angle is narrower than that of a wide-angle lens. The narrow-angle camera 1 is suitable for adjusting the focus on a near person and capturing an image of the person.

The wide-angle camera 2 includes a wide-angle lens. A wide-angle lens provides an angle of view for a camera which angle is wider than normal. A wide-angle camera also provides an angle of view for a camera which angle is wider than that of a narrow-angle lens. The wide-angle camera 2 is suitable for adjusting the focus on a far, wide-range background and capturing an image of the background.

The narrow-angle camera 1 and the wide-angle camera are preferably aimed in respective directions on an identical side relative to the housing. For instance, the narrow-angle camera 1 and the wide-angle camera 2 are preferably provided on an identical surface of a housing f the electronic device 100a. This arrangement makes it possible to capture an image of a person present in the same direction as an intended background. This makes it easy to position a person image over a background, and allows the person and the background to receive light in an identical manner so that natural composition can be carried out.

The DSPs (digital signal processors) 3 and 4 are each a microprocessor dedicated to digital signal processing, and are each typically used for real-time computing. The storage device 5 is configured to store a narrow-angle image captured by the narrow-angle camera 1 and a wide-angle image captured by the wide-angle camera 2.

The control device 6 is configured to centrally control the individual sections of the electronic device 100a. The control device 6 includes a person region extracting section 61, a background region extracting section 62, an image composite section 63, and a display control section 64. The electronic device 100a may include (i) a single narrow-angle camera 1 or two or more narrow-angle cameras 1, a single wide-angle camera 2 or two or more wide-angle cameras 2, and (iii) a single control device 6 or two or more control devices 6.

The person region extracting section 61 is configured to extract a person image from a narrow-angle image captured by the narrow-angle camera 1. More specifically, the person region extracting section 61 is configured to extract an edge portion of a person image by image recognition and extract a person image from the data.

The background region extracting section 62 is configured to extract a background image from a wide-angle image captured by the wide-angle camera 2. More specifically, the background region extracting section 62 is configured to extract an edge portion of a background image by image recognition and extract a background image from the data. The background region extracting section 62 may alternatively be configured to extract an edge portion of a person image from a wide-angle image and remove the region of the person image from the image data so as to use the remaining image data as a background image.

The image composite section 63 is configured to composite a background image and a person image with each other so as to generate a composite image. The display control section 64 is configured to cause the display device 7 to display a composite image generated by the image composite section 63. The display device 7 is configured to display a composite image under the control of the display control section 64. The display control section 64 is also capable of causing the display device 7 to display, as preview images, a background image and a person image that have not yet been composited with each other. Further, the image composite section 63 allows the user to, while looking at the preview images, adjust the respective positions of a background image and a person image relative to each other so as to generate a composite image.

With the above arrangement, the narrow-angle camera 1 and the wide-angle camera 2 are aimed in respective directions on an identical side relative to the housing. This makes it easy to, in a case where a composite image is to be generated that composites a background image and a person image, position the person image over the background, and allows the person and the background to receive light in an identical manner so that natural composition can be carried out.

Figure 2:
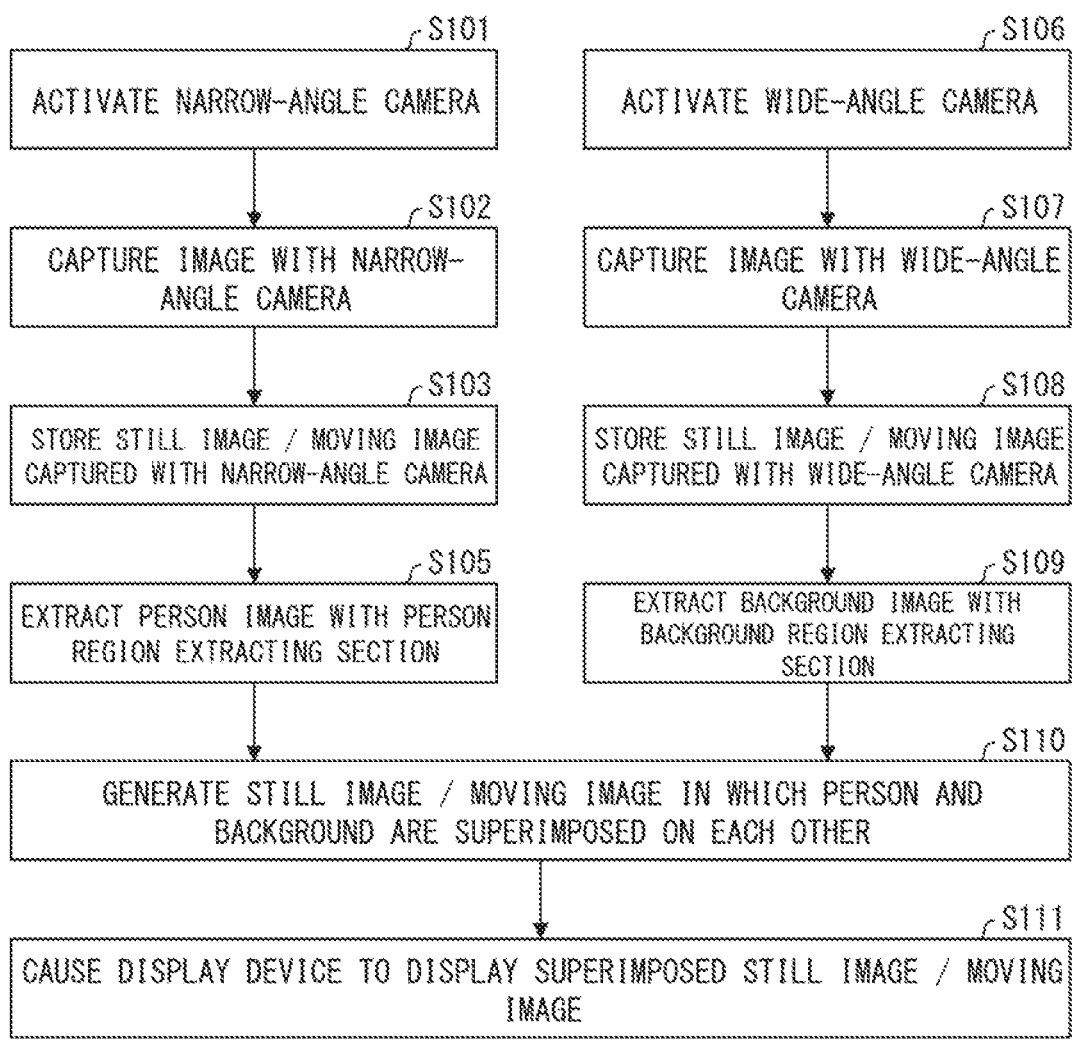
FIG. 2 is a flowchart illustrating a flow of how the electronic device operates.

With reference to a flowchart in FIG. 2, the following description will discuss how the electronic device 100a operates. In step S101, the control device 6 activates the narrow-angle camera 1. The process then goes to S102.

Figure 3:
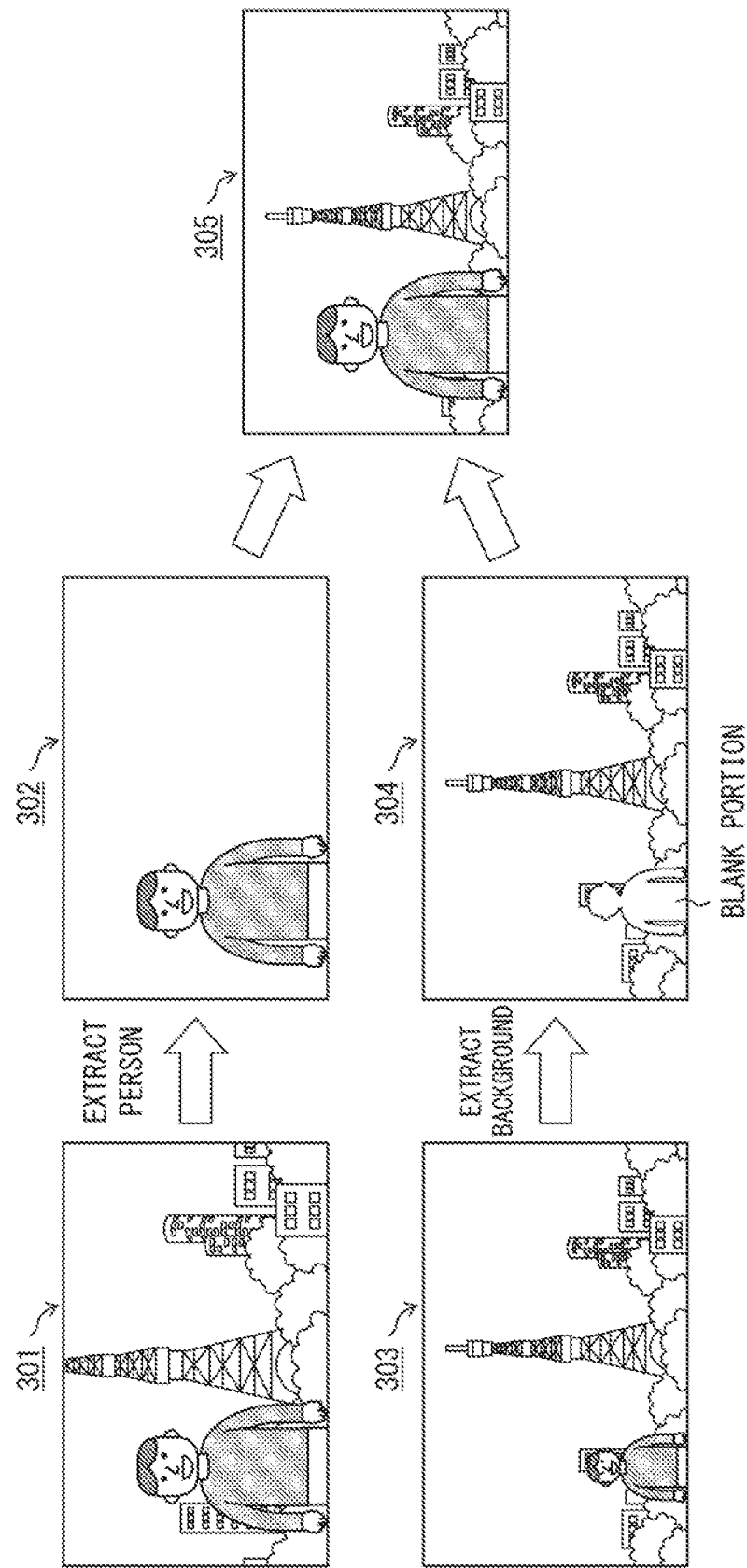
FIG. 3 provides diagrams illustrating how a composite image is generated by extracting a person image from a narrow-angle image, extracting a background image from a wide-angle image, and compositing the person image and the background image with each other.

In S102, the narrow-angle camera 1 captures a narrow-angle image. The process then goes to S103. FIG. 3 shows an image 301 as an example narrow-angle image captured by the narrow-angle camera 1.

In S103, the DSP 3 stores the narrow-angle image which is either a still image or moving image captured with use of the narrow-angle camera 1) in the storage device 5. The process then goes to S105.

In S105, the person region extracting section 61 extracts a person image from the narrow-angle image (person region extracting step). The process then goes to S110. FIG. 3 shows an image 302 as example image data obtained as a result of extracting a person image from a narrow-angle image.

In step S106, the control device 6 activates the wide-angle camera 2. The process then goes to S107. In S107, the wide-angle camera 2 captures a wide-angle image. The process then goes to S108. FIG. 3 shows an image 303 as an example wide-angle image captured by the wide-angle camera 2.

In S108, the DSP stores the wide-angle image (which is either a still image or moving image captured with use of the wide-angle camera 2) in the storage device 5. The process then goes to S109.

In S109, the background region extracting section 62 extracts a background image from the wide-angle image (background region extracting step, background region extracting process). The process then goes to S110. FIG. 3 shows an image 304 as example image data obtained as a result of extracting a background image from a wide-angle image. As shown in the drawing, that portion of a background image captured with use of the wide-angle camera 2 at which portion a person and a background overlaps with each other becomes blank in actuality (that is, the person image is taken out from the background image).

In S110, the image composite section 63 composites the background image and the person image with each other so as to generate a composite image (image compositing step). The process then goes to S111. FIG. 3 shows an image 305 as an example composite image generated by compositing the person image in the image 302 of FIG. 3 and the background image in the image 304 of FIG. 3 with each other. The image composite section 63, when compositing the background image and the person image with each other, (i) places the person image (extracted by the person region extracting section 61) over an image region of the background image which image region includes the blank portion and thereby (ii) hides the blank portion.

In S111, the display control section 64 causes the display device 7 to display the composite image (that is, a still image or moving image). The electronic device 100a may alternatively be configured to (i) cause the display device 7 to display preview images and (ii) prompt the user to see the position of the person image in real time and adjust the respective positions of the person image and the background image relative to each other. In this case, the user adjusts the respective positions of the person image and the background image in such a manner that the person image hides a blank portion of the image captured with use of the wide-angle camera 2 at which blank portion the person overlapped the background.

Embodiment 2

The following description will discuss another embodiment of the present invention. For convenience of explanation, any member of the present embodiment that is identical in function to a member described for any embodiment above is assigned a common reference sign and is not described here again.

Figure 4:
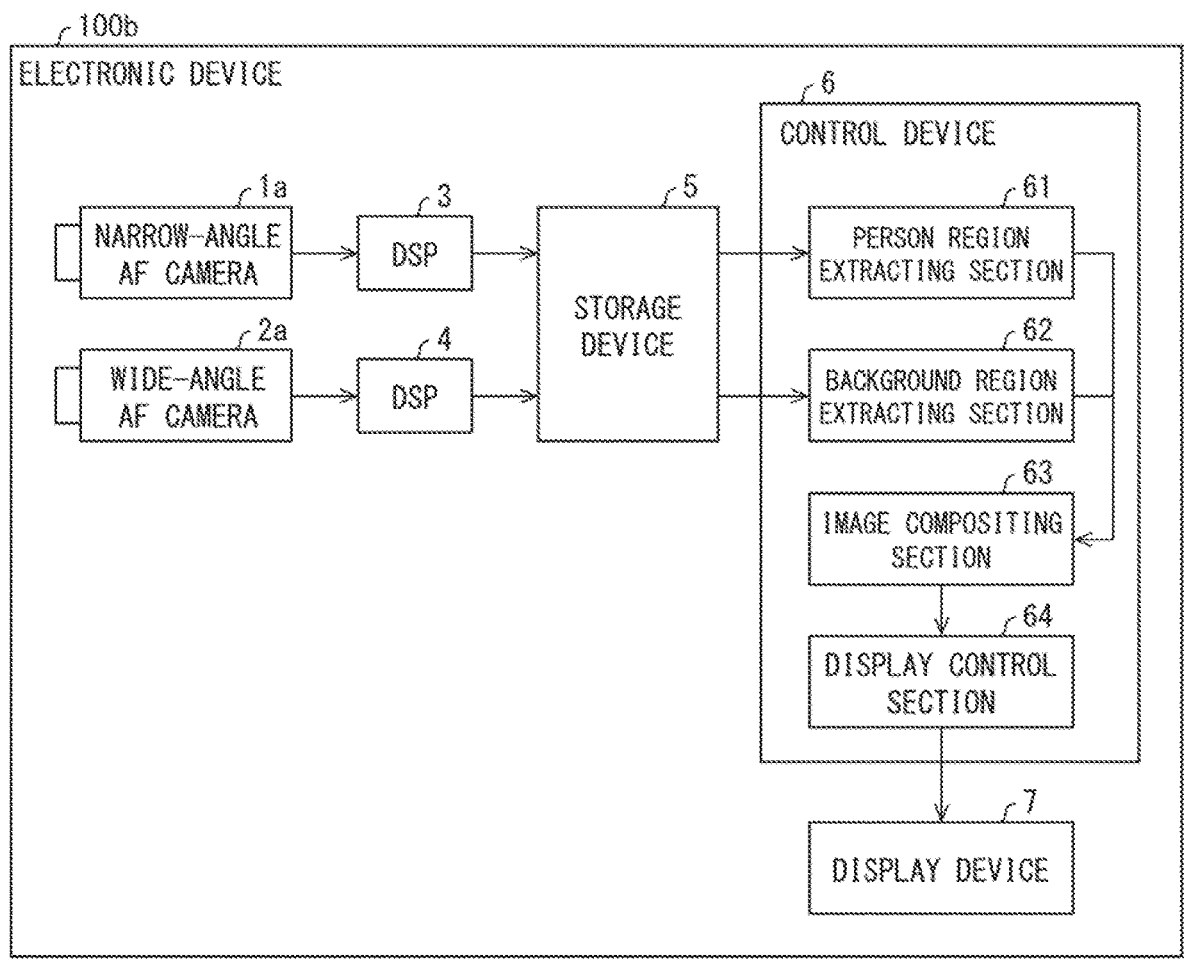
FIG. 4 is a block diagram schematically illustrating a configuration of an electronic device in accordance with Embodiment 2 of the present invention.

As illustrated in FIG. 4, an electronic device 100b in accordance with. Embodiment 2 of the present invention differs from the electronic device 100a of Embodiment 1 in that the electronic device 100b includes a narrow-angle AF camera (narrow-angle camera) 1a and a wide-angle AF camera (wide-angle camera) 2a in place of the narrow-angle camera 1 and the wide-angle camera 2 of the electronic device 100a.

The narrow-angle AF camera 1a includes a narrow-angle lens and has an autofocus function. The narrow-angle AF camera 1a includes an AF driving mechanism (such as a voice coil motor [VCM]) for autofocus involving use of a mechanism (actuator) for moving a lens.

The wide-angle AF camera 2a includes a wide-angle lens and has an autofocus function. The wide-angle AF camera 2a includes an AF driving mechanism (such as a VCM) for autofocus involving use of a mechanism (actuator) for moving a lens.

The wide-angle AF camera 2a is capable of adjusting the position of a lens so that an object (background) is in focus or out of focus. This arrangement makes it possible to generate (i) a composite image in which a background and a person are both in focus or (ii) a composite image in which a background is intentionally out of focus and which has great presence.

The electronic device 100b of the present embodiment operates as shown in the flowchart in FIG. 2 except that the narrow-angle camera 1 and the wide-angle camera 2 of Embodiment 1 have been replaced with the narrow-angle AF camera 1a and the wide-angle AF camera 2a, respectively.

Embodiment 3

The following description will discuss another embodiment of the present invention. For convenience of explanation, any member of the present embodiment that is identical in function to a member described for any embodiment above is assigned a common reference sign and is not described here again.

Figure 5:
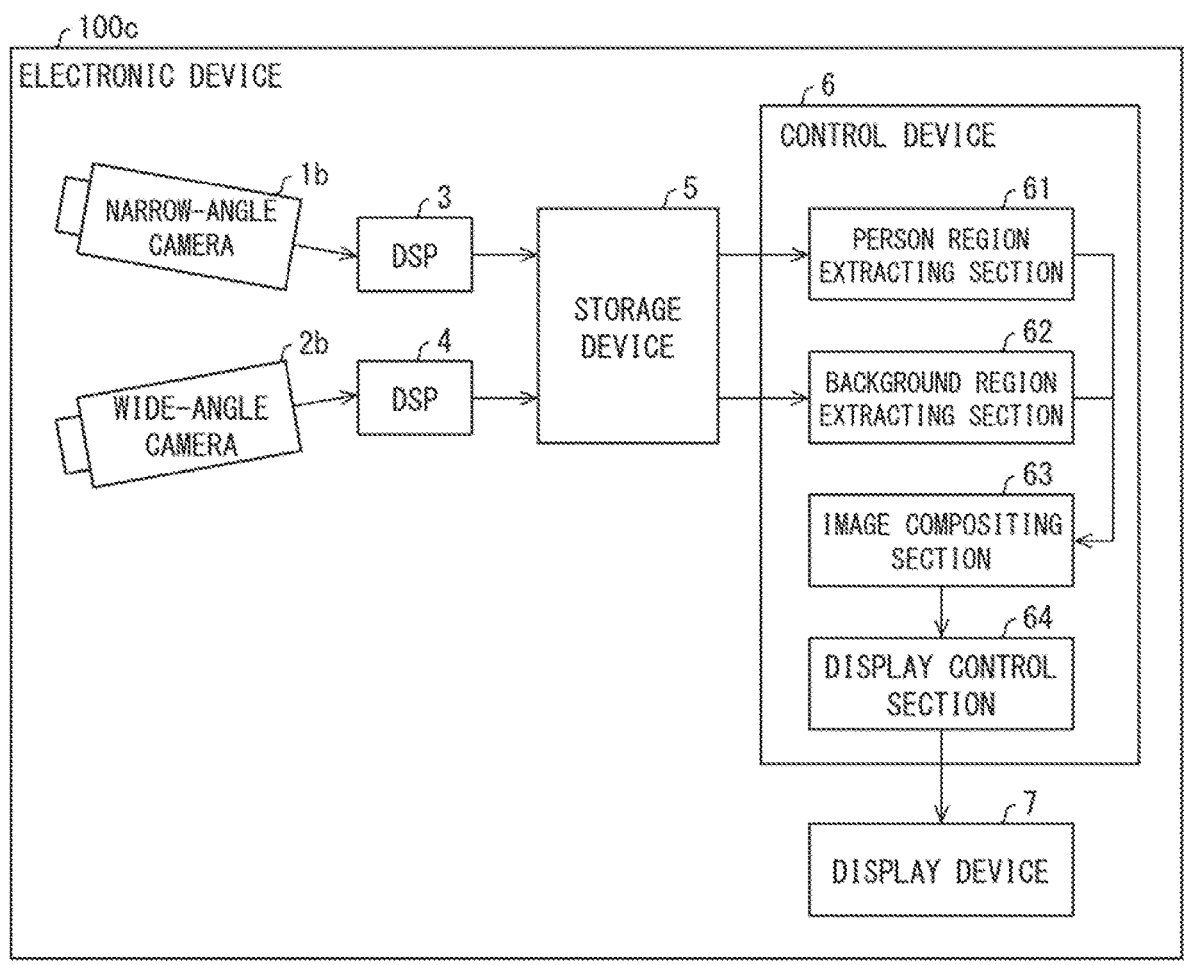
FIG. 5 is a block diagram schematically illustrating a configuration of an electronic device in accordance with Embodiment 3 of the present invention.
Figure 6:
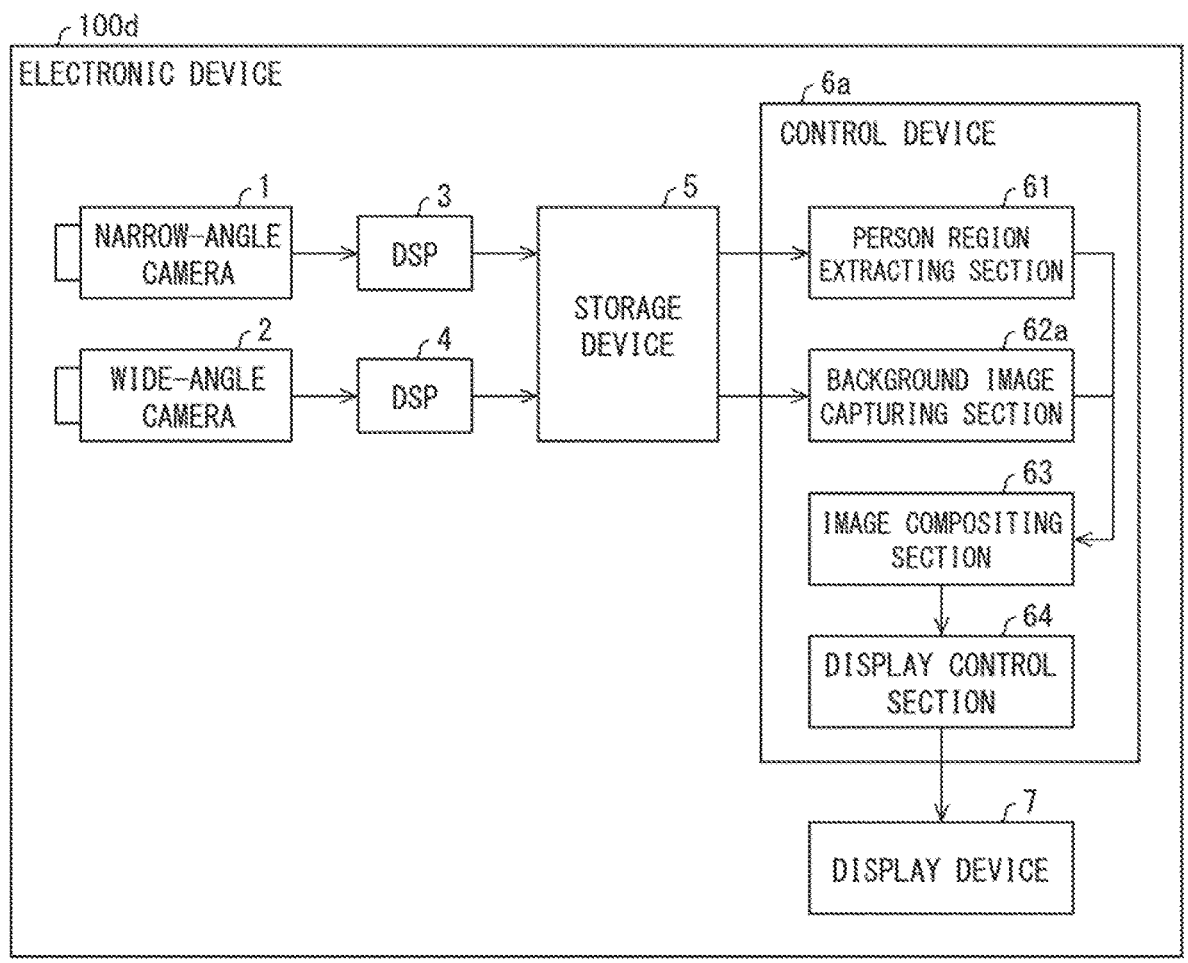
FIG. 6 is a block diagram schematically illustrating a configuration of an electronic device in accordance with Embodiment 4 of the present invention.

As illustrated in FIG. 5, an electronic device 100c in accordance with Embodiment 3 of the present invention differs from the electronic device 100a of Embodiment 1 in that the electronic device 100c includes a narrow-angle camera 1b and a wide-angle camera 2b in place of the narrow-angle camera 1 and the wide-angle camera 2 of the electronic device 100a.

As illustrated in the drawing, the electronic device 100c of the present embodiment is configured such that (i) the distance between the narrow-angle camera 1b and the wide-angle camera 2b is adjustable and that (ii) the respective inclinations of the narrow-angle camera 1b and the wide-angle camera 2b are adjustable. This configuration can be achieved by including in advance a tilting mechanism or a sliding mechanism at each of (i) a portion of the body to which portion the narrow-angle camera 1b is to be attached and a portion of the body to which portion the wide-angle camera 2b is to be attached. The electronic device 100c may alternatively be configured such that (i) either or both of the narrow-angle camera 1b and the wide-angle camera 2b are external cameras and that a tilting mechanism or a sliding mechanism is provided at a portion of the body to which portion the external camera(s) is to be attached.

With the above arrangement, separating the two cameras far apart from each other makes it possible to capture an image in which a background is not hidden. This makes it possible to (i) capture an image in which a background and a person do not overlap and thereby (ii) generate a composite image with great presence.

With the above arrangement, angling the two cameras differently makes it possible to capture an image in which a background is not hidden. This makes it possible to (i) capture an image in which a background and a person do not overlap and thereby (ii) generate a composite image with great presence.

In a case where the electronic device 100c is a smartphone, the two cameras can be separated far apart from each other because the distance between the two cameras varies according to each model. Further, in a case where the electronic device 100c is a smartphone, the two cameras can also be attached in such a manner as to have respective angles different from each other.

In a case where the narrow-angle camera 1b (or wide-angle camera 2b) is mounted in a smartphone and the wide-angle camera. 2h (or narrow-angle camera 1b) is connectable and external to the smartphone, it is possible to angle the two cameras differently and/or separate the two cameras far apart from each other.

The electronic device 100c of the present embodiment operates as shown in the flowchart in FIG. 2 except that the narrow-angle camera 1 and the wide-angle camera 2 of Embodiment 1 have been replaced with the narrow-angle camera 1b and the wide-angle camera 2b, respectively.

Embodiment 4

The following description will discuss another embodiment of the present invention. For convenience of explanation, any member of the present embodiment that is identical in function to a member described for any embodiment above is assigned a common reference sign and is not described here again.

An electronic device 100d of the present embodiment includes a narrow-angle camera 1 and a wide-angle camera 2 on an identical surface of a housing, and is configured to extract a person image from a narrow-angle image captured by the narrow-angle camera 1 and (ii) composite the person image with a background image, captured as a wide-angle image with use of the wide-angle camera 2, so as to generate a composite image. A control device 6a of the present embodiment differs from the control device 6 of Embodiment 1 in that the control device 6a includes a background image capturing section 62a in place of the background region extracting section 62. The background image capturing section 62a is configured to cause the wide-angle camera 2 to capture a background image as a wide-angle image.

The electronic device 100d of the present embodiment differs from the electronic device 100a of Embodiment 1 in that the electronic device 100d is configured to not remove a person image from a background image and composite the background image with a person image cut out from a narrow-angle image.

Figure 7:
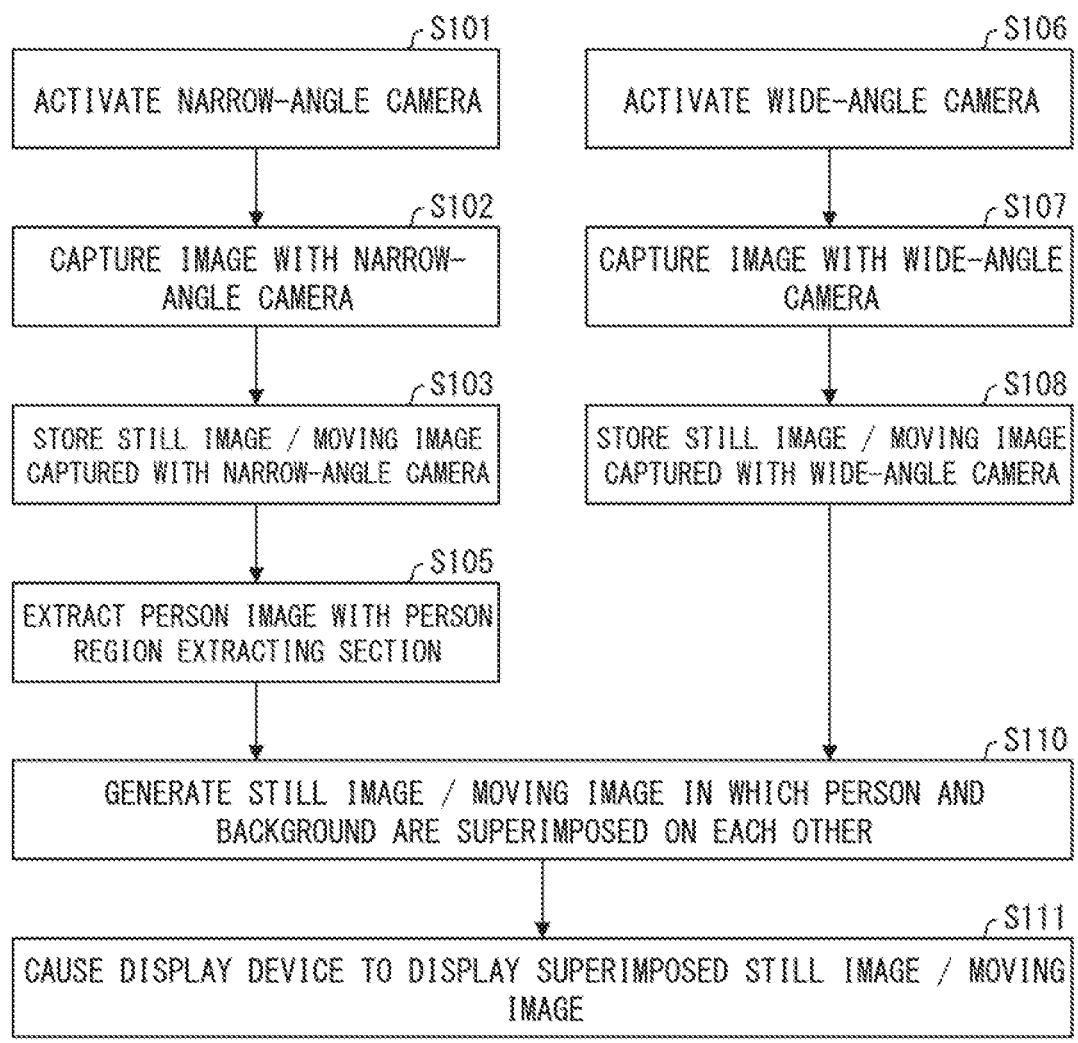
FIG. 7 is a flowchart illustrating a flow of how the electronic device operates.

With reference to a flowchart in FIG. 7, the following description will discuss how the electronic device 100d operates. The flowchart in FIG. 7 differs from the flowchart in FIG. 2 in that the flowchart in FIG. 7 omits S109 between S108 and S110.

In S110, the image composite section 63 generates a composite image by compositing) a background image captured as a wide-angle image with use of the wide-angle camera 2 with (ii) a person image extracted from a narrow-angle image by the person region extracting section 61. The process then goes to S111. FIG. 8 shows an image 804 as an example composite image generated by compositing the person image in the image 802 of FIG. 8 and the background image in the image 803 of FIG. 8 with each other.

With the above arrangement, the narrow-angle camera 1 and the wide-angle camera 2 are aimed in respective directions on an identical side relative to the housing. This makes it easy to, in a case where a composite image is to be generated that composites a background image and a person image, position the person image over the background, and allows the person and the background to receive light in an identical manner so that natural composition can be carried out.

Variations

The electronic device 100d of the present embodiment may be configured similarly to the above form such that the narrow-angle camera 1 and the wide-angle camera 2 are provided on an identical surface of the housing of the electronic device 100d. The electronic device 100d of the present embodiment may also be configured such that the narrow-angle camera 1 and the wide-angle camera 2 each have an autofocus function.

The electronic device 100d of the present embodiment may be configured such that the distance between the narrow-angle camera 1 and the wide-angle camera 2 is adjustable. The electronic device 100d of the present embodiment may be configured such that the respective inclinations of the narrow-angle camera 1 and the wide-angle camera 2 are adjustable.

Software Implementation Example

Control blocks of the control device 6 of each of the electronic devices 100a to 100d (particularly, the person region extracting section 61, the background region extracting section 62, the background image capturing section 62a, and the image composite section 63) can be realized by a logic circuit (hardware) provided in an integrated circuit (IC chip) or the like or can be alternatively realized by software.

In the latter case, the control device 6 includes a computer that executes instructions of a program that is software realizing the foregoing functions. The computer includes, for example, at least one processor (control device) and at least one computer-readable storage medium on which the program is stored. An object of the present invention can be achieved by the processor of the computer reading and executing the program stored in the storage medium. The processor is, for example, a central processing unit (CPU). Examples of the storage medium encompass a read-only memory (ROM) as well as "a non-transitory tangible medium" such as a tape, a disk, a card, a semiconductor memory, and a programmable logic circuit. The computer may further include a random access memory (RAM) for loading the program. The program can be supplied to or made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

An electronic device (100d) in accordance with a first aspect of the present invention is an electronic device including: a narrow-angle camera (1); a wide-angle camera (2); and a control device (6), the control device being configured to: (a) extracting a person image from a narrow-angle image captured by the narrow-angle camera and (b) making a composition of (i) a background image captured with use of the wide-angle camera and (ii) the person image, the narrow-angle camera and the wide-angle camera being aimed in respective directions on an identical side relative to a housing of the electronic device.

With the above arrangement, the narrow-angle camera and the wide-angle camera are aimed in respective directions on an identical side relative to the housing. This makes it easy to, in a case where a composite image is to be generated that composites a background image and a person image, position the person image over the background, and allows the person and the background to receive light in an identical manner so that natural composition can be carried out.

An electronic device (100a to 100c) in accordance with a second aspect of the present invention is an electronic device including: a narrow-angle camera (1, 1a, 1b); a wide-angle camera (2, 2a, 2b); and a control device (6), the control device being configured to: extract a person image from a narrow-angle image captured by the narrow-angle camera, extract a background image from a wide-angle image captured by the wide-angle camera, and make a composition of the background image and the person image, the narrow-angle camera and the wide-angle camera being aimed in respective directions on an identical side relative to a housing of the electronic device.

With the above arrangement, the narrow-angle camera and the wide-angle camera are aimed in respective directions on an identical side relative to the housing. This makes it easy to, in a case where a composite image is to be generated that composites a background image and a person image, position the person image over the background, and allows the person and the background to receive light in an identical manner so that natural composition can be carried out.

An electronic device in accordance with a third aspect of the present invention is arranged as in the first or second aspect and is further arranged such that the narrow-angle camera and the wide-angle camera are provided on an identical surface of the housing. This arrangement makes it possible to capture an image of a person present in the same direction as an intended background. This makes it easy to position a person image over a background, and allows the person and the background to receive light in an identical manner so that natural composition can be carried out.

An electronic device in accordance with a fourth aspect of the present invention is arranged as in any one of the first to third aspects and is further arranged such that the narrow-angle camera and the wide-angle camera each have an autofocus function. This arrangement makes it possible to generate a composite image in which a background and a person are both in focus or (ii) a composite image in which a background is intentionally out of focus and which has great presence.

An electronic device in accordance with a fifth aspect of the present invention is arranged as in any one of the first to fourth aspects and is further arranged such that a distance between the narrow-angle camera and the wide-angle camera is adjustable. With the above arrangement, separating the two cameras far apart from each other makes it possible to capture an image in which a background is not hidden. This makes it possible to capture an image in which a background and a person do not overlap and thereby generate a composite image with great presence.

An electronic device in accordance with a sixth aspect of the present invention is arranged as in any one of the first to fifth aspects and is further arranged such that each inclination of the narrow-angle camera and the wide-angle camera is adjustable. With the above arrangement, angling the two cameras differently makes it possible to capture an image in which a background is not hidden. This makes it possible to (i) capture an image in which a background and a person do not overlap and thereby (ii) generate a composite image with great presence.

A control device in accordance with a seventh aspect of the present invention for an electronic device is a control device (6) for an electronic device (100a to 100c) including a narrow-angle camera (1) and a wide-angle camera (2), the control device including: a person region extracting section (61) configured to extract a person image from a narrow-angle image captured by the narrow-angle camera; a background region extracting section (62) configured to extract a background image from a wide-angle image captured by the wide-angle camera; and an image composite section (63) configured to make a composition of the background image and the person image, the narrow-angle camera and the wide-angle camera being aimed in respective directions on an identical side relative to a housing of the electronic device. This arrangement makes it possible to produce an effect similar to that produced by the second aspect.

A control method in accordance with an eighth aspect of the present invention for an electronic device is a control method for an electronic device including a narrow-angle camera and a wide-angle camera, the control method including the steps of: (a) extracting a person image from a narrow-angle image captured by the narrow-angle camera; (b) extracting a background image from a wide-angle image captured by the wide-angle camera; and (c) making a composition of the background image and the person image, the narrow-angle camera and the wide-angle camera being aimed in respective directions on an identical side relative to a housing of the electronic device. This method makes it possible to produce an effect similar to that produced by the second aspect.

A control device in accordance with each aspect of the present invention for an electronic device can be realized by a computer. The computer is operated based on a control program for causing the computer to realize the control device by causing the computer to operate as each section (software element) included in the control device and (ii) a computer-readable storage medium in which the control program is stored, Such a control program and a computer-readable storage medium are included in the scope of the present invention.

Supplemental Notes

The present invention is not limited to the embodiments, but can be altered by a skilled person in the art within the scope of the claims. The present invention also encompasses, in its technical scope, any embodiment derived by combining technical means disclosed in differing embodi-

REFERENCE SIGNS LIST 1, 1b Narrow-angle camera
1a Narrow-angle AF camera (narrow-angle camera)
2, 2b Wide-angle camera
2a Wide-angle AF camera (wide-angle camera)
3, 4 DSP
5 Storage device
6, 6a Control device
7 Display device
61 Person region extracting section
62 Background region extracting section
62a Background image capturing section
63 Image compositing section
64 Display control section
100a to 100d Electronic device

The invention claimed is:

1. An electronic device, comprising:
a narrow-angle camera;
a wide-angle camera; and
control circuitry,
said control circuitry being configured to:
(i) extract a person image from a narrow-angle image captured by the narrow-angle camera,
(ii) extract a background image from a wide-angle image captured by the wide-angle camera, and
(iii) make a composition of the background image and the person image extracted from the narrow-angle image by placing the person image extracted from the narrow-angle image over a region of a person image in the wide-angle image,
the narrow-angle camera and the wide-angle camera being aimed in respective directions on an identical side relative to a housing of the electronic device,
said control circuitry being configured to:
extract the background image such that the region of the person image in the wide-angle image becomes a blank portion; and
make the composition by placing the person image extracted from the narrow-angle image over an image region which includes the blank portion.

2. The electronic device as set forth in claim 1, wherein the narrow-angle camera and the wide-angle camera are provided on an identical surface of the housing.

3. The electronic device as set forth in claim 1, wherein the narrow-angle camera and the wide-angle camera each have an autofocus function.

4. The electronic device as set forth in claim 1, wherein a distance between the narrow-angle camera and the wide-angle camera is adjustable.

5. The electronic device as set forth in claim 1, wherein each inclination of the narrow-angle camera and the wide-angle camera is adjustable.

6. A control circuitry for an electronic device including a narrow-angle camera and a wide-angle camera,
said control circuitry comprising:
a person region extracting section configured to extract a person image from a narrow-angle image captured by the narrow-angle camera;
a background region extracting section configured to extract a background image from a wide-angle image captured by the wide-angle camera; and
an image composite section configured to make a composition of the background image and the person image extracted from the narrow-angle image by placing the person image extracted from the narrow-angle image over a region of a person image in the wide-angle image,
the narrow-angle camera and the wide-angle camera being aimed in respective directions on an identical side relative to a housing of the electronic device,
the background region extracting section being configured to extract the background image such that the region of the person image in the wide-angle image becomes a blank portion,
the image composite section being configured to make the composition by placing the person image extracted from the narrow-angle image over an image region which includes the blank portion.

7. A control method for an electronic device including a narrow-angle camera and a wide-angle camera,
said control method comprising the steps of:
(a) extracting a person image from a narrow-angle image captured by the narrow-angle camera;
(b) extracting a background image from a wide-angle image captured by the wide-angle camera; and
(c) making a composition of the background image and the person image extracted from the narrow-angle image by placing the person image extracted from the narrow-angle image over a region of a person image in the wide-angle image,
the narrow-angle camera and the wide-angle camera being aimed in respective directions on an identical side relative to a housing of the electronic device,
step (b) comprising extracting the background image such that the region of the person image in the wide-angle image becomes a blank portion,
step (c) comprising making the composition by placing the person image extracted from the narrow-angle image over an image region which includes the blank portion.

* * * * *